US012198871B2

(12) United States Patent
Strand

(10) Patent No.: US 12,198,871 B2
(45) Date of Patent: Jan. 14, 2025

(54) ELECTRICAL SWITCH

(71) Applicant: ABB Schweiz AG, Baden (CH)

(72) Inventor: Fredrik Strand, Vaasa (FI)

(73) Assignee: ABB Schweiz AG, Baden (CH)

( * ) Notice: Subject to any disclaimer, the term of this patent is extended or adjusted under 35 U.S.C. 154(b) by 189 days.

(21) Appl. No.: 17/664,921

(22) Filed: May 25, 2022

(65) Prior Publication Data

US 2022/0384121 A1 Dec. 1, 2022

(30) Foreign Application Priority Data

Jun. 1, 2021 (EP) .................................... 21177126

(51) Int. Cl.

| | |
|---|---|
| ***H01H 19/14*** | (2006.01) |
| ***H01H 1/20*** | (2006.01) |
| ***H01H 1/50*** | (2006.01) |
| ***H01H 19/635*** | (2006.01) |
| ***H01H 50/54*** | (2006.01) |

(52) U.S. Cl.
CPC ............ *H01H 1/2083* (2013.01); *H01H 1/50* (2013.01); *H01H 19/6355* (2013.01); *H01H 50/546* (2013.01)

(58) Field of Classification Search
None
See application file for complete search history.

(56) References Cited

U.S. PATENT DOCUMENTS

| | | | | |
|---|---|---|---|---|
| 4,713,498 A * | 12/1987 | Ludwig | H01H 19/6355 | 200/18 |
| 5,736,698 A * | 4/1998 | Mattlar | H01H 19/635 | 200/16 R |
| 7,223,929 B2 * | 5/2007 | Dumont | H01H 11/0018 | 200/43.11 |
| 8,115,122 B2 * | 2/2012 | Machida | H01H 3/022 | 200/16 A |
| 8,222,546 B2 * | 7/2012 | Leischner | H01H 71/0235 | 200/11 R |

(Continued)

FOREIGN PATENT DOCUMENTS

| | | | |
|---|---|---|---|
| DE | 1472417 | A1 | 1/1969 |
| DE | 102019116325 | A1 | 12/2019 |
| FR | 2816106 | A1 | 5/2002 |

OTHER PUBLICATIONS

European Search Report; Application No. EP 21 17 7126; Issued: Nov. 12, 2021; 2 Pages.

*Primary Examiner* — Felix O Figueroa
(74) *Attorney, Agent, or Firm* — Whitmyer IP Group LLC

(57) ABSTRACT

An electrical switch including a frame, an operating shaft, and a bridge member movable in a depth direction relative to the frame by rotation of the operating shaft, wherein the depth direction is parallel with a rotation axis of the operating shaft, and wherein the operating shaft is adapted to exert a first opening force to the bridge member during an opening event. The electrical switch includes an anti-tilting member movable in a lateral direction relative to the frame by rotation of the operating shaft, the lateral direction being perpendicular to the depth direction, wherein the anti-tilting member is adapted to exert a second opening force to the bridge member during the opening event, the second opening force being parallel to the first opening force and spaced apart from it in the lateral direction.

16 Claims, 4 Drawing Sheets

(56) References Cited

U.S. PATENT DOCUMENTS

| | | | | |
|---|---|---|---|---|
| 11,776,768 | B2 * | 10/2023 | Strand ...................... | H01H 9/02<br>200/238 |
| 2022/0301791 | A1 * | 9/2022 | Mujawar .............. | H01H 19/626 |

* cited by examiner

ELECTRICAL SWITCH

FIELD

The present invention relates to an electrical switch.

BACKGROUND

A known electrical switch comprises a frame, and a bridge member movable in a depth direction relative to the frame between a first bridge position and a second bridge position by rotation of the operating shaft, wherein the first bridge position corresponds to a connected state of the electrical switch, and the second bridge position corresponds to a disconnected state of the electrical switch.

One of the problems associated with the above known electrical switch is that a first opening force which the operating shaft is adapted to exert to the bridge member during an opening event of the electrical switch is offset relative to a centre of mass of the bridge member, and therefore the first opening force incurs rotation or tilting of the bridge member during the opening event.

BRIEF DESCRIPTION OF THE INVENTION

An object of the present invention is to provide an electrical switch so as to solve the above problem. The objects of the invention are achieved by an electrical switch described in the following.

The invention is based on the idea of providing the electrical switch with an anti-tilting member movable in a lateral direction relative to the frame between a first position and a second position by rotation of the operating shaft, wherein the anti-tilting member is adapted to exert a second opening force to the bridge member during the opening event, the second opening force being adapted to provide an anti-tilting torque for cancelling at least partially a tilting torque provided by the first opening force to the bridge member.

An advantage of the electrical switch of the invention is that tilting of the bridge member during the opening event is eliminated or at least substantially reduced.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
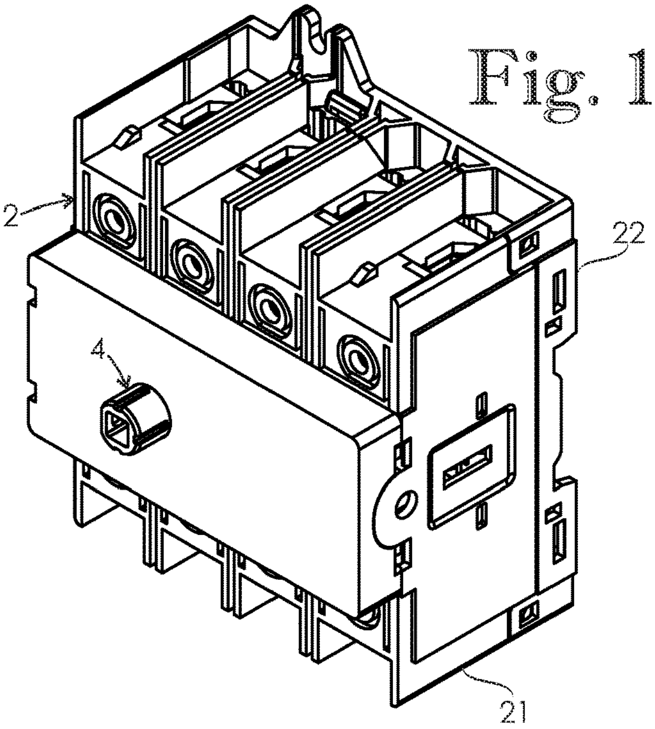
FIG. 1 shows an electrical switch according to an embodiment of the invention.
Figure 2:
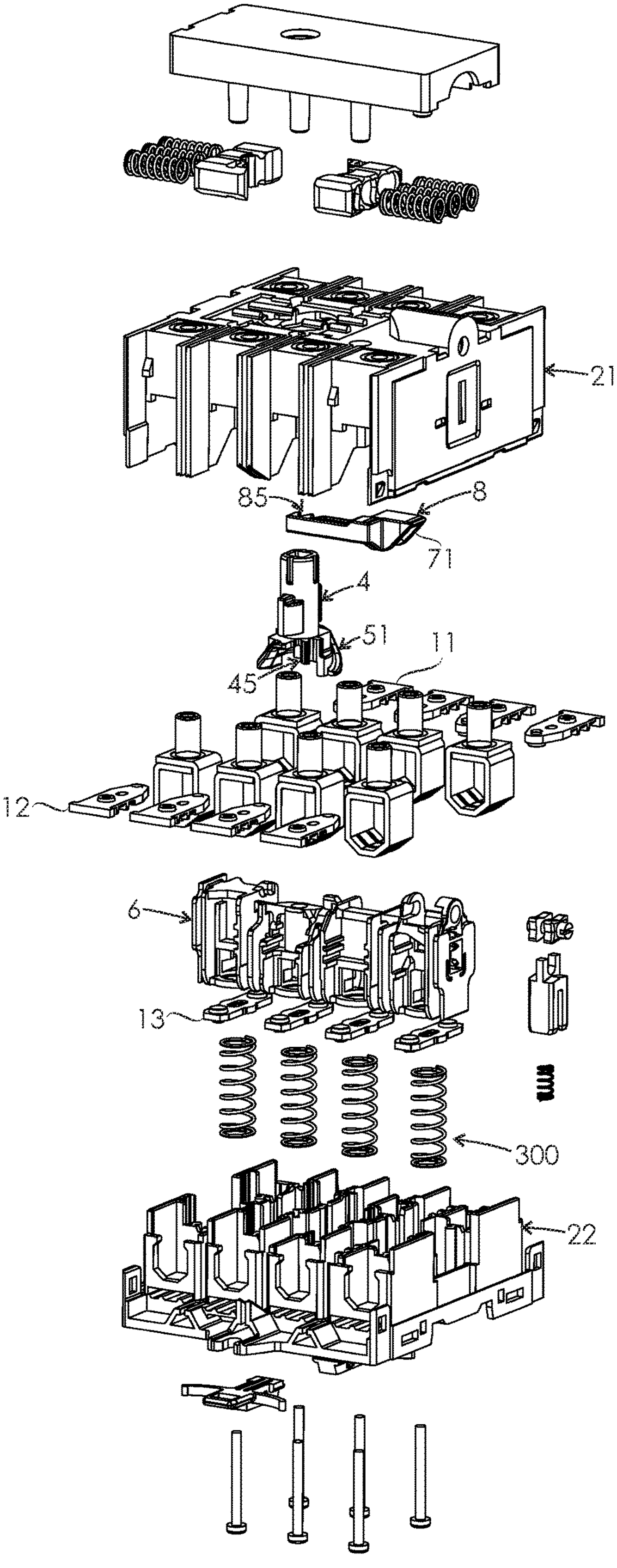
FIG. 2 shows an exploded view of the electrical switch shown in FIG. 1.

FIG. 1 shows an electrical switch, and FIG. 2 shows an exploded view thereof. The electrical switch comprises a frame 2, an operating shaft 4, a bridge member 6, an anti-tilting member 8, a movable contact system, a stationary contact system and a return spring system 300.

The frame 2 comprises a first frame portion 21, and a second frame portion 22. A mechanism of the electrical switch is mounted in the frame 2. The operating shaft 4 is rotatable relative to the frame 2 between a first shaft position and a second shaft position. The bridge member 6 is made of electrically insulating material, and is movable in a depth direction relative to the frame 2 between a first bridge position and a second bridge position by rotation of the operating shaft 4, wherein the depth direction is parallel with the rotation axis of the operating shaft 4.

The movable contact system has four movable contacts 13. The movable contacts 13 are electrically insulated from each other. Each of the movable contacts 13 is movable relative to the frame 2 between a connected position and a disconnected position such that the connected position corresponds to a connected state of the electrical switch, and the disconnected position corresponds to a disconnected state of the electrical switch. The stationary contact system has four stationary contact pairs each comprising a first stationary contact 11 and a second stationary contact 12. The stationary contact system is stationary mounted relative to the frame 2.

Figure 3A:
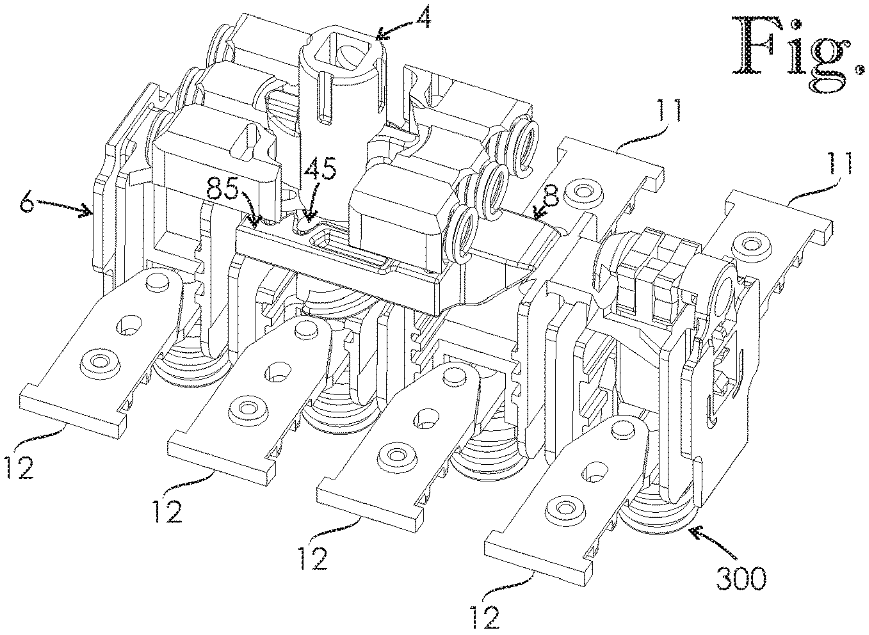
FIGS. 3A-3C show portions of a mechanism of the electrical switch shown in FIG. 1 in a connected state of the electrical switch.
Figure 3B:
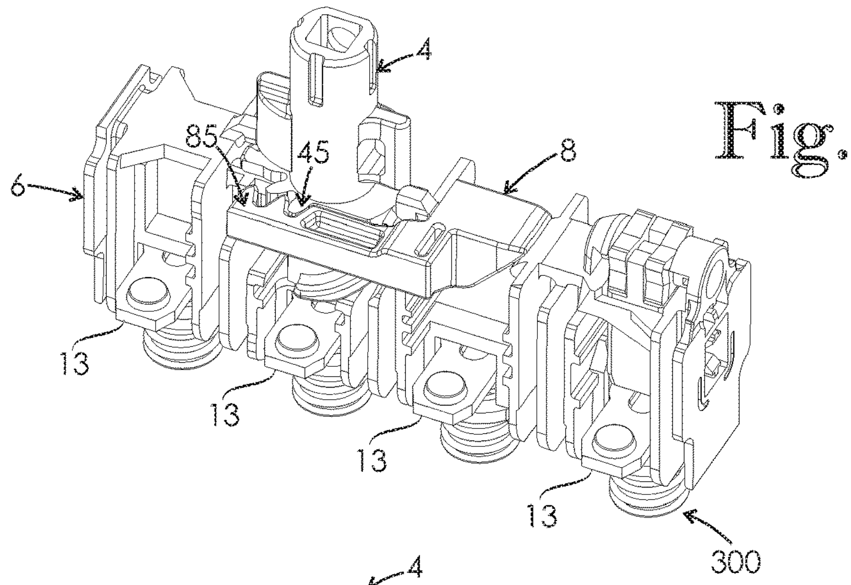
Figure 3C:
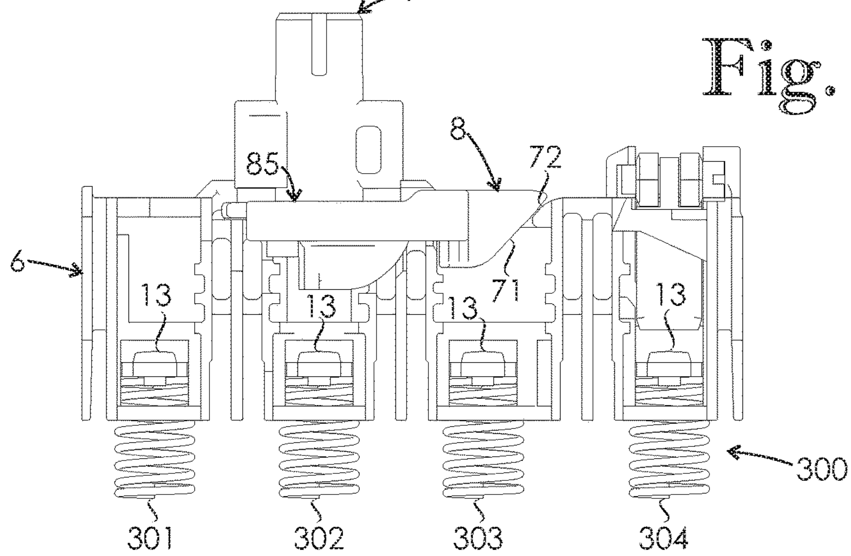
Figure 4A:
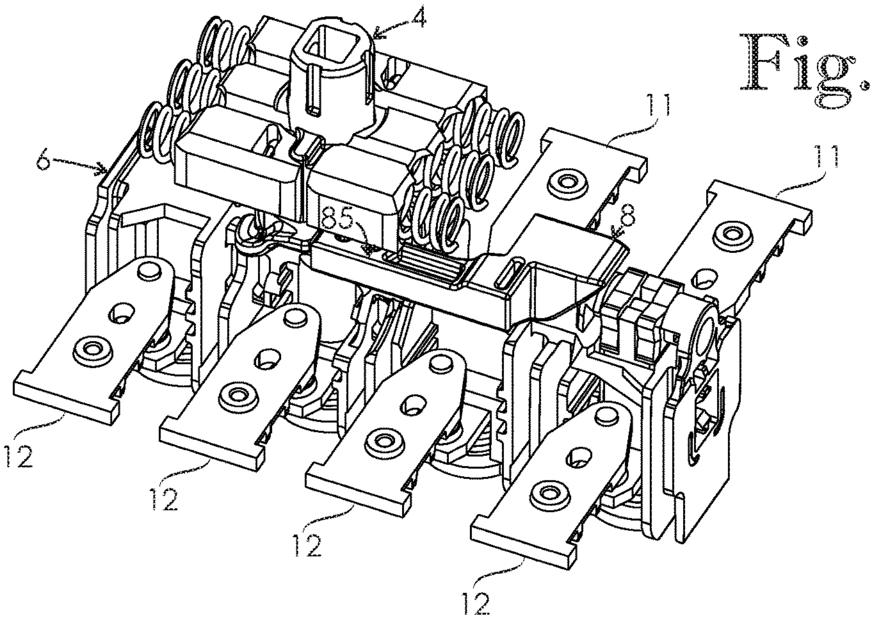
FIGS. 4A-4C show portions of the mechanism of the electrical switch shown in FIG. 1 in a disconnected state of the electrical switch.
Figure 4B:
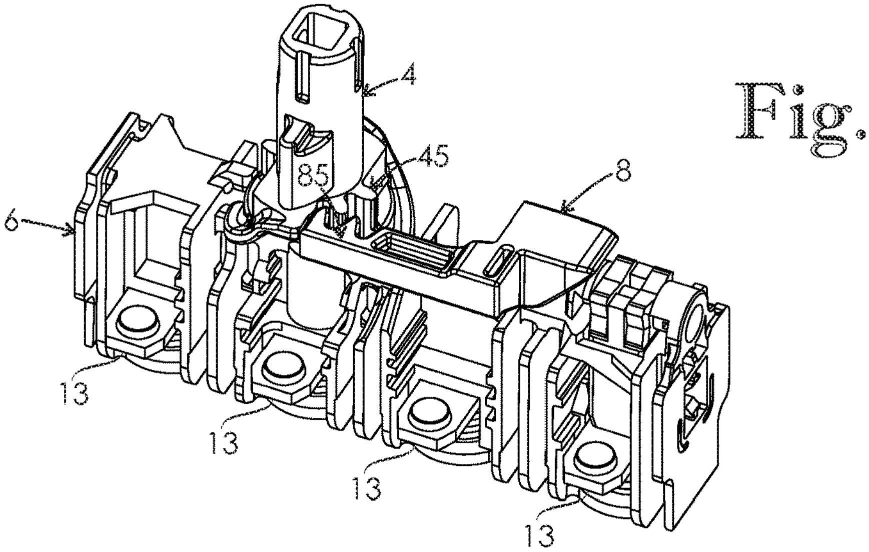
Figure 4C:
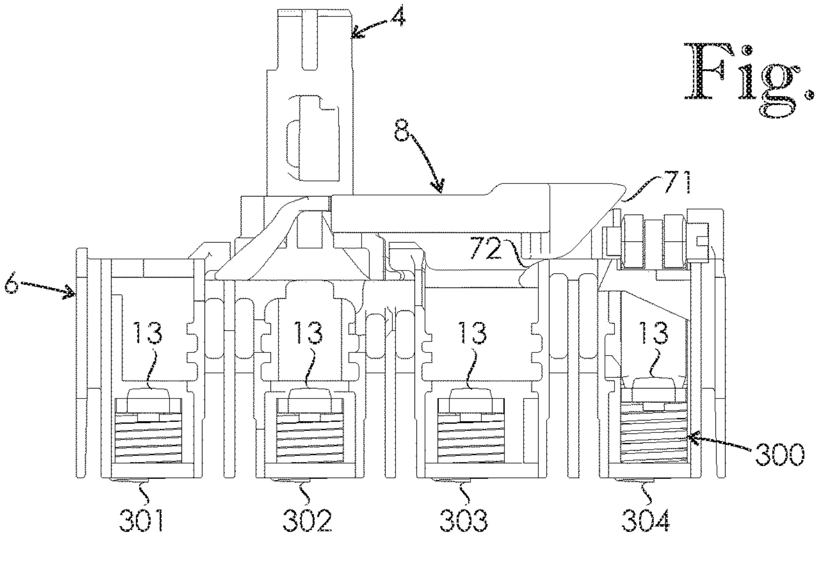

FIGS. 3A-3C show portions of a mechanism of the electrical switch shown in FIG. 1 in the connected state of the electrical switch. FIGS. 4A-4C show portions of the mechanism of the electrical switch shown in FIG. 1 in a disconnected state of the electrical switch. In FIGS. 3A and 4A, the stationary contact system and an operating shaft spring system are shown, while said components are omitted from FIGS. 3B, 3C, 4B and 4C in order to better show other parts of the mechanism.

In the connected state of the electrical switch, the first stationary contact 11 and the second stationary contact 12 of each stationary contact pair are electrically conductively connected to each other by a corresponding movable contact 13 of the movable contact system. In the disconnected state of the electrical switch the first stationary contact 11 and the second stationary contact 12 of each stationary contact pair are electrically separated from each other.

A rotation of the operating shaft 4 from the first shaft position to the second shaft position provides an opening event in which the bridge member 6 moves from the first bridge position to the second bridge position, and the electrical switch transfers from the connected state to the disconnected state. During the opening event, the operating shaft 4 is adapted to exert a first opening force to the bridge member 6, and the bridge member 6 is adapted to exert forces to the movable contacts 13 for moving the movable contacts 13 from the connected position to the disconnected position. The first opening force is an off-centre force such that its vector is located at a distance from a centre of mass of the bridge member 6 in the lateral direction. Herein, the first opening force is a vector sum of a plurality of component forces exerted by the operating shaft 4 to the bridge member 6 during the opening event. Referring to FIG. 3C, the bridge member 6 is adapted to exert downwards forces to the movable contacts 13 during the opening event.

The anti-tilting member 8 is movable in a lateral direction relative to the frame 2 between a first position and a second position by rotation of the operating shaft 4, the lateral direction being perpendicular to the depth direction. The anti-tilting member 8 is adapted to move exclusively in the lateral direction relative to the frame 2.

The anti-tilting member 8 is adapted to exert a second opening force to the bridge member 6 during the opening event, the second opening force being parallel to the first opening force and spaced apart from it in the lateral direction. In the lateral direction, the second opening force is located on an opposite side of the centre of mass of the bridge member 6 than the first opening force. Herein, the second opening force is a vector sum of a plurality of component forces exerted by the anti-tilting member 8 to the bridge member 6 during the opening event.

Figure 6A:
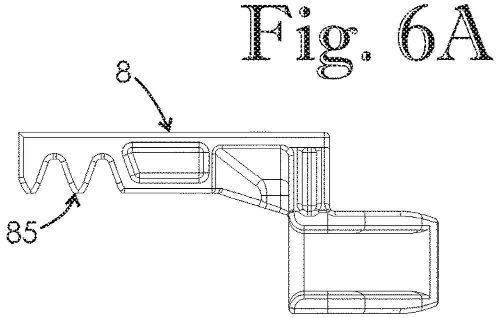
FIGS. 6A and 6B show an anti-tilting member of the electrical switch shown in FIG. 1 from different directions.
Figure 6B:
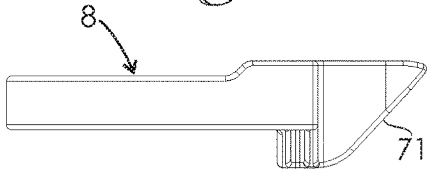

The anti-tilting member 8 comprises a first ramp surface 71, and the bridge member 6 comprises a second ramp surface 72 adapted to co-operate with the first ramp surface 71 during the opening event such that said co-operation provides the second opening force. The first ramp surface 71 is best seen in FIG. 6B, which shows the anti-tilting member 8 from a direction perpendicular to both the depth direction and the lateral direction. The second ramp surface 72 is best seen in FIG. 3C, which shows the portion of the mechanism from a direction perpendicular to both the depth direction and the lateral direction.

An angle of the first ramp surface 71 relative to the depth direction is approximately 45°. In an alternative embodiment, an angle of the first ramp surface relative to the depth direction is in a range of 25°-65°. Shapes of the first ramp surface and the second ramp surface are selected as a pair such that cooperation thereof is able to provide the second opening force.

In FIGS. 3A-3C, the operating shaft 4 is in the first shaft position, the bridge member 6 is in the first bridge position, the movable contacts 13 are in their connected positions, and the anti-tilting member 8 is in the first position thereof. In FIGS. 4A-4C, the operating shaft 4 is in the second shaft position, the bridge member 6 is in the second bridge position, the movable contacts 13 are in their disconnected positions, and the anti-tilting member 8 is in the second position thereof.

The operating shaft 4 comprises a first screw thread surface 51, and the bridge member 6 comprises a second screw thread surface 52 adapted to cooperate with the first screw thread surface 51 during the opening event such that said co-operation provides the first opening force. The operating shaft 4 is adapted to remain stationary in the depth direction during a rotation between the first shaft position and the second shaft position.

Figure 5A:
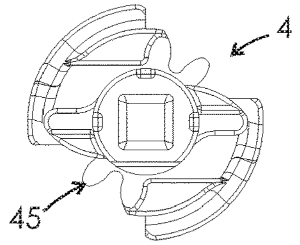
FIGS. 5A and 5B show an operating shaft of the electrical switch shown in FIG. 1 from different directions.
Figure 5B:
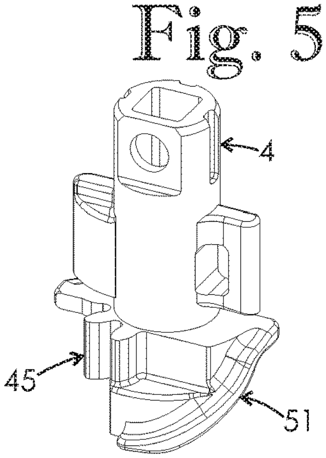
Figure 7A:
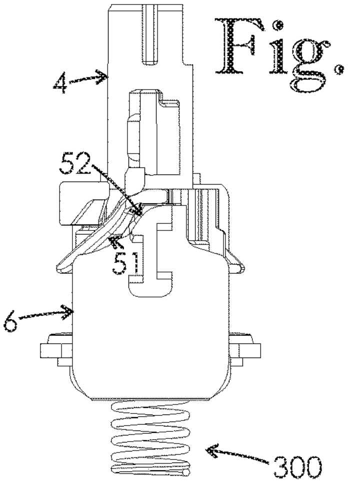
FIGS. 7A and 7B illustrate co-operation of a first screw thread surface provided on the operating shaft, and a second screw thread surface provided on a bridge member during an opening event of the electrical switch shown in FIG. 1.
Figure 7B:
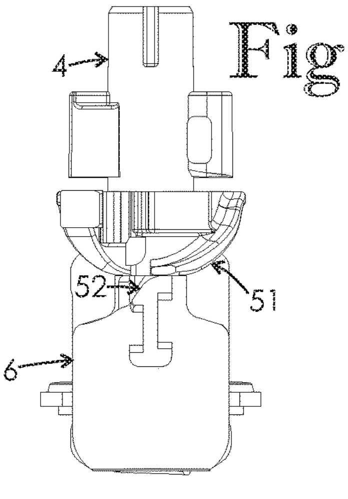

The first screw thread surface 51 is best seen in FIG. 5B showing the operating shaft 4 obliquely from side. The second screw thread surface 52 is best seen in FIGS. 7A and 7B, which illustrate co-operation of the first screw thread surface 51 and the second screw thread surface 52 during the opening event of the electrical switch. In FIG. 7A, the electrical switch in the connected state, and in FIG. 7B, the electrical switch in the disconnected state. In FIGS. 7A and 7B, the mechanism is shown in cross section, and several components have been omitted in order to better show the co-operation between the first screw thread surface 51 and the second screw thread surface 52. In FIGS. 7A and 7B, image planes are perpendicular to the lateral direction.

The operating shaft 4 comprises a gear member 45, and the anti-tilting member 8 comprises a gear rack member 85 adapted to co-operate with the gear member 45 such that a movement of the anti-tilting member 8 from the first position to the second position during the opening event is provided by forces exerted by the gear member 45 to the gear rack member 85.

The gear member 45 is best seen in FIG. 5A showing the operating shaft 4 from a direction parallel to the rotation axis of the operating shaft 4. The gear rack member 85 is best seen in FIG. 6A showing the anti-tilting member 8 from a direction parallel to the depth direction. Teeth of the gear member 45 and gear rack member 85 are compatible with each other in order to provide said cooperation.

The return spring system 300 is adapted to exert a return force to the movable contact system in order to return the movable contacts 13 to the connected position if the movable contacts 13 are deflected therefrom in the direction of the disconnected position. The return spring system 300 comprises four return springs 301, 302, 303 and 304. Each of the return springs is in contact with a corresponding movable contact 13.

The return springs of the return spring system 300 are located symmetrically with respect to the bridge member 6 such that a vector sum of forces exerted by the return spring system 300 to the movable contacts 13 passes through the centre of mass of the bridge member 6. Therefore, the forces exerted by the return spring system 300 to the movable contacts 13 do not tilt the bridge member 6.

In an alternative embodiment, the return spring system comprises a first return spring and a second return spring located on opposite sides of a centre of mass of the bridge member in the lateral direction, and the return force is directed such that an absolute value of a torque provided by the return force to the bridge member is smaller than an absolute value of a torque provided by the first opening force.

A rotation of the operating shaft 4 from the second shaft position to the first shaft position is adapted to provide a closing event in which the bridge member 6 moves from the second bridge position to the first bridge position, and the electrical switch transfers from the disconnected state to the connected state. During the closing event, the return spring system 300 is adapted to exert forces to the movable contacts 13 for moving the movable contacts 13 from the disconnected position to the connected position. The movable contacts 13 exert forces to the bridge member 6 for moving the bridge member 6 from the second bridge position to the first bridge position.

It will be obvious to a person skilled in the art that the inventive concept can be implemented in various ways. The invention and its embodiments are not limited to the examples described above but may vary within the scope of the claims.

The invention claimed is:

1. An electrical switch comprising:

a frame;

an operating shaft rotatable relative to the frame between a first shaft position and a second shaft position;

a bridge member movable in a depth direction relative to the frame between a first bridge position and a second bridge position by rotation of the operating shaft, wherein the depth direction is parallel with a rotation axis of the operating shaft; and a movable contact system having a plurality of movable contacts, each of the movable contacts being movable relative to the frame between a connected position and a disconnected position such that the connected position corresponds to a connected state of the electrical switch, and the disconnected position corresponds to a disconnected state of the electrical switch, wherein the rotation of the operating shaft from the first shaft position to the second shaft position is adapted to provide an opening event in which the bridge member moves from the first bridge position to the second bridge position, and the electrical switch transfers from the connected state to the disconnected state, wherein the operating shaft is adapted to exert a first opening force to the bridge member during the opening event, wherein the electrical switch comprises an anti-tilting member movable in a lateral direction relative to the frame between a first position and a second position by the rotation of the operating shaft, the lateral direction being perpendicular to the depth direction, wherein the anti-tilting member is adapted to exert a second opening force to the bridge member during the opening event, the second opening force being parallel to the first opening force and spaced apart from the first opening force in the lateral direction, wherein the anti-tilting member comprises a first ramp surface, and the bridge member comprises a second ramp surface adapted to co-operate with the first ramp surface during the opening event such that said co-operation provides the second opening force, wherein during the opening event, the anti-tilting member moves translationally in the lateral direction in response to the rotation of the operating shaft.

2. The electrical switch according to claim 1, wherein the operating shaft comprises a first screw thread surface, and the bridge member comprises a second screw thread surface adapted to co-operate with the first screw thread surface during the opening event such that said co-operation provides the first opening force, and the operating shaft is adapted to remain stationary in the depth direction during the rotation between the first shaft position and the second shaft position.

3. The electrical switch according to claim 1, wherein the operating shaft comprises a gear member, and the anti-tilting member comprises a gear rack member adapted to co-operate with the gear member such that a movement of the anti-tilting member from the first position to the second position during the opening event is provided by forces exerted by the gear member to the gear rack member.

4. The electrical switch according to claim 1, wherein the electrical switch comprises a return spring system adapted to exert a return force to the movable contact system in order to return the plurality of movable contacts to the connected position if the plurality of movable contacts are deflected therefrom in the direction of the disconnected position.

5. The electrical switch according to claim 4, wherein the return force is directed such that an absolute value of a torque provided by the return force to the bridge member is smaller than an absolute value of a torque provided by the first opening force.

6. The electrical switch according to claim 5, wherein the absolute value of the torque provided by the return force to the bridge member is smaller than or equal to 30% of the absolute value of the torque provided by the first opening force.

7. The electrical switch according to claim 5, wherein the return spring system comprises a plurality of return springs.

8. The electrical switch according to claim 7, wherein the return spring system comprises a first return spring and a second return spring located on opposite sides of a centre of mass of the bridge member in the lateral direction.

9. The electrical switch according to claim 1, wherein the electrical switch comprises a stationary contact system having a plurality of stationary contact pairs each comprising a first stationary contact and a second stationary contact, the stationary contact system being stationary mounted relative to the frame, wherein in the connected state the first stationary contact and the second stationary contact of each stationary contact pair are electrically conductively connected to each other by a corresponding movable contact of the movable contact system, and in the disconnected state the first stationary contact and the second stationary contact of each stationary contact pair are electrically separated from each other.

10. The electrical switch according to claim 1, wherein the operating shaft comprises a first screw thread surface, and the bridge member comprises a second screw thread surface adapted to co-operate with the first screw thread surface during the opening event such that said co-operation provides the first opening force, and the operating shaft is adapted to remain stationary in the depth direction during the rotation between the first shaft position and the second shaft position.

11. The electrical switch according to claim 6, wherein the return spring system comprises a plurality of return springs.

12. The electrical switch according to claim 1, wherein during the opening event, the anti-tilting member moves exclusively in the lateral direction.

13. The electrical switch according to claim 1, wherein during the opening event, the entire anti-tilting member slides in the lateral direction.

14. The electrical switch according to claim 1, wherein the second opening force is adapted to provide an anti-tilting torque for cancelling at least partially a tilting torque provided by the first opening force to the bridge member.

15. The electrical switch according to claim 1, wherein in the lateral direction, the second opening force is located on an opposite side of the center of mass of the bridge member than the first opening force.

16. An electrical switch comprising:

a frame;

an operating shaft rotatable relative to the frame between a first shaft position and a second shaft position;

a bridge member movable in a depth direction relative to the frame between a first bridge position and a second bridge position by rotation of the operating shaft, wherein the depth direction is parallel with a rotation axis of the operating shaft; and a movable contact system having a plurality of movable contacts that are electrically insulated from each other, each of the movable contacts being movable relative to the frame between a connected position and a disconnected position such that the connected position corresponds to a connected state of the electrical switch, and the disconnected position corresponds to a disconnected state of the electrical switch, wherein the rotation of the operating shaft from the first shaft position to the second shaft position provides an opening event in which the bridge member moves from the first bridge position to the second bridge position, and the electrical switch transfers from the connected state to the disconnected state, wherein the operating shaft exerts a first opening force directly on the bridge member during the opening event, wherein the electrical switch comprises an anti-tilting member movable translationally in a lateral direction relative to the frame between a first position and a second position in response to the rotation of the operating shaft, the lateral direction being perpendicular to the depth direction, wherein the anti-tilting member exerts a second opening force directly on the bridge member during the opening event, wherein the first opening force is an off-center force with a vector located at a distance from a center of mass of the bridge member, and the second opening force is located on an opposite side of the center of mass of the bridge member relative to the first opening force.

* * * * *